United States Patent
Kamiyamaguchi et al.

(10) Patent No.: US 9,309,970 B2
(45) Date of Patent: Apr. 12, 2016

(54) CONTINUOUSLY VARIABLE TRANSMISSION FOR VEHICLE

(71) Applicant: HONDA MOTOR CO., LTD., Tokyo (JP)

(72) Inventors: Tsutomu Kamiyamaguchi, Wako (JP); Takumi Shinojima, Fujisawa (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/792,712

(22) Filed: Jul. 7, 2015

(65) Prior Publication Data

US 2016/0010747 A1    Jan. 14, 2016

(30) Foreign Application Priority Data

Jul. 8, 2014  (JP) .................... 2014-140835
Apr. 14, 2015  (JP) .................... 2015-082848

(51) Int. Cl.
| | |
|---|---|
| *B60W 10/109* | (2012.01) |
| *F16H 61/664* | (2006.01) |
| *F16H 37/02* | (2006.01) |
| *F16H 15/44* | (2006.01) |
| *F16H 37/08* | (2006.01) |
| *F16H 59/44* | (2006.01) |

(52) U.S. Cl.
CPC ............ *F16H 61/6646* (2013.01); *F16H 15/44* (2013.01); *F16H 37/022* (2013.01); *F16H 37/086* (2013.01); *F16H 59/44* (2013.01); *F16H 2037/0886* (2013.01); *F16H 2037/0893* (2013.01)

(58) Field of Classification Search
CPC .. F16H 59/44; F16H 61/6646; B60W 10/109; B60W 40/1005; B60W 40/076; B60W 40/105
See application file for complete search history.

(56) References Cited

U.S. PATENT DOCUMENTS

| | | | | |
|---|---|---|---|---|
| 6,251,039 | B1* | 6/2001 | Koga ............... | 475/216 |
| 6,866,606 | B2* | 3/2005 | Ooyama ............ | 475/216 |
| 2002/0169047 | A1* | 11/2002 | Hiraku et al. ...... | 475/206 |
| 2003/0229437 | A1* | 12/2003 | Joe et al. .......... | 701/51 |

FOREIGN PATENT DOCUMENTS

JP    2003-194204 A    7/2003

* cited by examiner

*Primary Examiner* — Huan Le
(74) *Attorney, Agent, or Firm* — Squire Patton Boggs (US) LLP

(57) ABSTRACT

The present invention provides a CVT including a transmission mechanism and a planetary gear mechanism which includes a plurality of rotation elements. The transmission mechanism can differentially operate in a predetermined operation mode. The CVT includes a vehicle speed specifying unit for specifying a vehicle speed based on a rotation speed of a rotation member. The unit specifies the vehicle speed from the rotation speed when the rotation speed exceeds a threshold, and specifies the vehicle speed based on a target driving force, a running resistance and a weight of the vehicle when the rotation speed is not more than the threshold.

5 Claims, 6 Drawing Sheets

CONTINUOUSLY VARIABLE TRANSMISSION FOR VEHICLE

BACKGROUND OF THE INVENTION

1. Field of the Invention

The present invention relates to a continuously variable transmission for a vehicle.

2. Description of the Related Art

As a continuously variable transmission for a vehicle, a transmission capable of changing a speed ratio to a very low speed range has been proposed. As such a continuously variable transmission, Japanese Patent Laid-Open No. 2003-194204 discloses a continuously variable transmission that combines a toroidal type continuously variable transmission mechanism and a planetary gear mechanism. The continuously variable transmission of Japanese Patent Laid-Open No. 2003-194204 has a mode in which a driving force is input to the planetary gear mechanism through the continuously variable transmission mechanism, and also input to the planetary gear mechanism without an intervention of the continuously variable transmission mechanism as well, thereby differentially operating the planetary gear mechanism. In this mode, conversion between normal rotation and reverse rotation of the output shaft can be performed around a state (geared neutral: GN) in which rotation of the output shaft is stopped by adjusting the speed ratio of the continuously variable transmission mechanism.

To control the speed ratio of the continuously variable transmission mechanism, vehicle speed information is necessary. As a sensor used to detect the vehicle speed, for example, a pulse sensor such as a magnetic pickup sensor that detects the rotation speed of the output shaft of the continuously variable transmission is known. In the range of very low speed (very low rotation speed) before and after GN, however, the pulse sensor may be unable to correctly detect the rotation speed, and it may be difficult to set the speed ratio according to the vehicle speed. A sensor having a higher detection accuracy may be used. However, this leads to an increase in cost.

SUMMARY OF THE INVENTION

It is an object of the present invention to enable setting of the speed ratio of a continuously variable transmission mechanism even in a very low speed range while suppressing an increase in cost.

According to an aspect of the present invention, there is provided a continuously variable transmission for a vehicle, comprising: a continuously variable transmission mechanism to which a driving force from a driving source provided in the vehicle is input; and a planetary gear mechanism including a plurality of rotation elements which are a sun gear, a ring gear, or a carrier, wherein the continuously variable transmission is capable of operating in a predetermined operation mode, in the predetermined operation mode, the driving force is input to a first rotation element out of the plurality of rotation elements through the continuously variable transmission mechanism, the driving force is input to a second rotation element out of the plurality of rotation elements without an intervention of the continuously variable transmission mechanism, and the driving force is output through a third rotation element out of the plurality of rotation elements, the continuously variable transmission mechanism further comprises: a target driving force calculation unit configured to calculate a target driving force of the vehicle based on an accelerator opening; a running resistance calculation unit configured to calculate a running resistance of the vehicle; a rotation speed detection unit configured to detect a rotation speed of a rotation member provided in the vehicle; a vehicle speed specifying unit configured to specify a vehicle speed based on a detection result of the rotation speed detection unit; and a setting unit configured to set a target speed ratio of the continuously variable transmission mechanism based on the vehicle speed specified by the vehicle speed specifying unit and a target rotation speed of the driving source, and the vehicle speed specifying unit specifies the vehicle speed from the detection result when the detection result of the rotation speed detection unit exceeds a threshold, and specifies the vehicle speed based on the target driving force calculated by the target driving force calculation unit, the running resistance calculated by the running resistance calculation unit, and a weight of the vehicle when the detection result of the rotation speed detection unit is not more than the threshold.

Further features of the present invention will become apparent from the following description of exemplary embodiments (with reference to the attached drawings).

DESCRIPTION OF THE EMBODIMENTS

Figure 1:
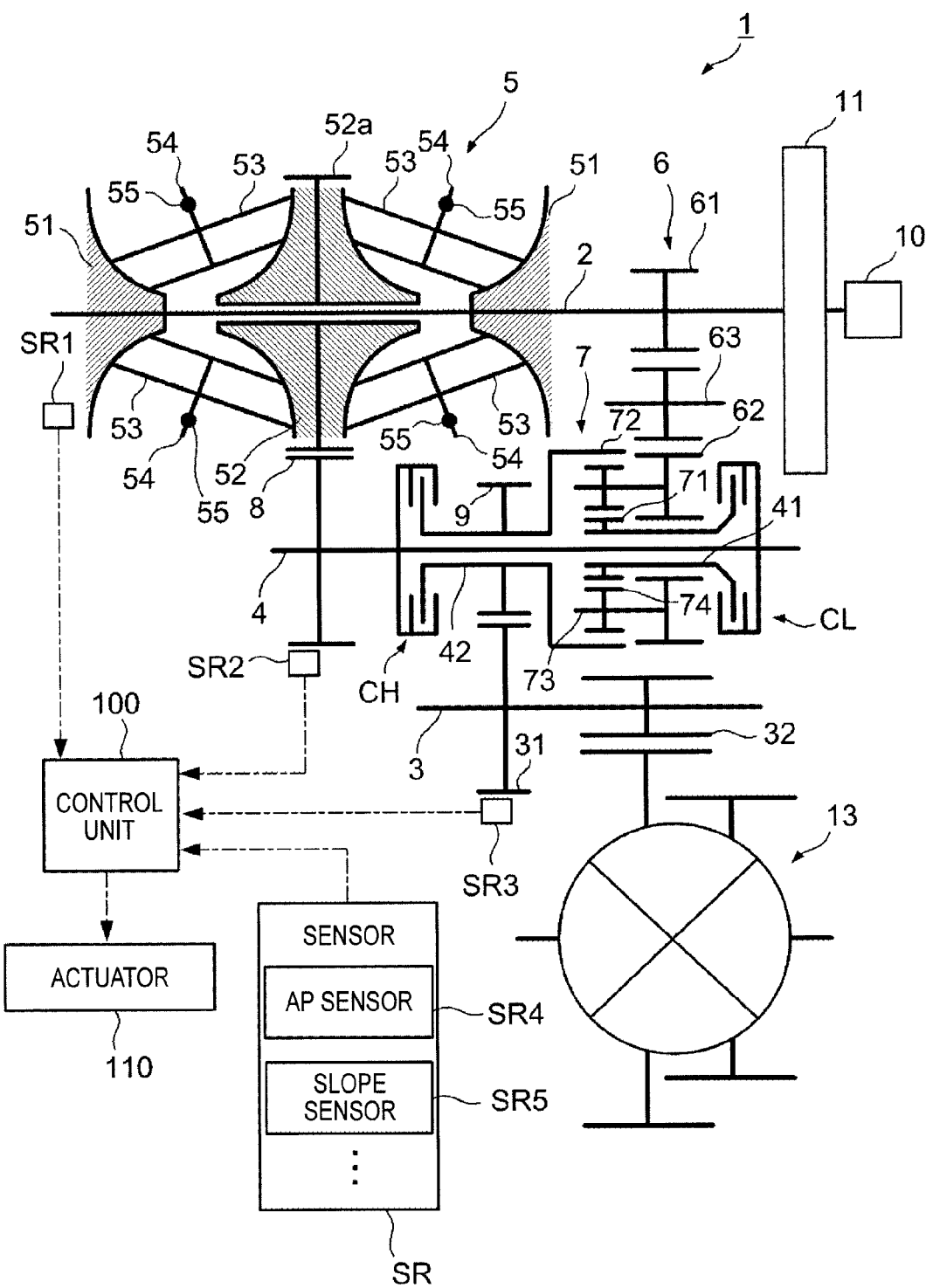
FIG. 1 is a schematic view of a continuously variable transmission according to an embodiment of the present invention.

FIG. 1 is a schematic view of a continuously variable transmission 1 according to an embodiment of the present invention. FIG. 1 shows the skeleton diagram of the mechanical portion of the continuously variable transmission 1 and the block diagram of a control system.

The continuously variable transmission 1 is a continuously variable transmission for a vehicle, which is mounted on a vehicle including an engine (internal combustion engine) 10 serving as a driving source.

The continuously variable transmission 1 includes an input shaft 2, an output shaft (counter shaft) 3, an intermediate shaft 4, a continuously variable transmission mechanism 5, an idle gear train 6, a planetary gear mechanism 7, and clutches CH and CL.

The driving force of the engine 10 is input to the input shaft 2 through a flywheel 11. The rotation of the input shaft 2 is decelerated or accelerated by the continuously variable transmission mechanism 5 or the planetary gear mechanism 7 and output from the output shaft 3. The input shaft 2, the output shaft 3, and the intermediate shaft 4 are arranged to be parallel to each other.

In this embodiment, the continuously variable transmission mechanism 5 is a toroidal type continuously variable transmission mechanism. Note that another variable transmission mechanism such as a belt type continuously variable transmission mechanism can also be employed.

The continuously variable transmission mechanism 5 includes a pair of input-side discs 51, an output-side disc 52, and a plurality of power rollers 53.

The pair of input-side discs 51 are concentrically connected to the input shaft 2 and rotate integrally together with the input shaft 2. The driving force of the driving source 10 is thus input to the continuously variable transmission mechanism 5. The output-side disc 52 is arranged between the pair of input-side discs 51. The output-side disc 52 is rotatably provided to be coaxial with respect to the input shaft 2. The power rollers 53 are rolling elements that are arranged between the input-side discs 51 and the output-side disc 52 and frictionally roll between the input-side discs 51 and the output-side disc 52 to transmit the driving force.

Each power roller 53 is rotatably supported by a rotating shaft 54 and can swing about a swing shaft 55 (trunnion) that is perpendicular to the rotating shaft 54. The power roller 53 rotates about the rotating shaft 54 serving as the rotation center and rolls on a toroidal surface (rolling contact surface) formed on the inner surface of the input-side disc 51 and a toroidal surface (rolling contact surface) formed on the inner surface of the output-side disc 52. When caused to swing about the swing shaft 55 to change the tilt angle, the power roller 53 rolls on the toroidal surfaces while changing the contact pressures (frictional forces) and the contact portions to the toroidal surfaces. The power rollers 53 are configured to thus continuously change the speed ratio (ratio) of the continuously variable transmission mechanism 5.

External teeth 52a for output are provided on the outer surface of the output-side disc 52. A transmission gear 8 that is fixed to the intermediate shaft 4 so as to rotate integrally together with it meshes with the external teeth 52a.

The planetary gear mechanism 7 includes a plurality of rotation elements 71 to 73 arranged to be coaxial with respect to the intermediate shaft 4. The rotation element 71 is a sun gear and will sometimes be referred to as the sun gear 71 hereinafter. The rotation element 72 is a ring gear and will sometimes be referred to as the ring gear 72 hereinafter. The rotation element 73 is a carrier and will sometimes be referred to as the carrier 73 hereinafter. The carrier 73 axially supports a pinion 74 that meshes with the sun gear 71 and the ring gear 72 so as to allow the pinion 74 to rotate on its axis and around.

The idle gear train 6 includes gears 61 to 63. The gear 61 is fixed to the input shaft 2 and rotates integrally together with the input shaft 2. The gear 62 is fixed to the carrier 73. The gear 62 and the carrier 73 integrally rotate about the intermediate shaft 4. The gear 63 is rotatably axially supported by the casing of the continuously variable transmission 1 and can rotate about an axis parallel to the input shaft 2. The gear 63 meshes with the gear 61 and the gear 62. Hence, the driving force of the driving source 10 is always input to the carrier 73 through the input shaft 2 and the idle gear train 6 without an intervention of the continuously variable transmission mechanism 5.

Rotation members 41 and 42 are rotatably provided to be coaxial with respect to the intermediate shaft 4. The sun gear 71 is fixed to the rotation member 41. The ring gear 72 and a gear 9 are fixed to the rotation member 42. The gear 9 meshes with a gear 31 fixed to the output shaft 3. An output gear 32 that meshes with a differential gear 13 is fixed to the output shaft 3.

Each of the clutches CH and CL is an engaging mechanism that disengageably connects the rotation elements and is formed from, for example, a multiplate wet clutch. The clutch CH disengageably connects the intermediate shaft 4 and the rotation member 42. In other words, when the clutch CH is in an engaging state (driving transmission state), the driving force is transmitted between the output-side disc 52, the ring gear 72, and the gear 9 through the intermediate shaft 4 and the gear 8. When the clutch CH is in a disengaging state (driving transmission cancel state), the driving force is not transmitted between the output-side disc 52, the ring gear 72, and the gear 9 through the intermediate shaft 4 and the gear 8. The clutch CH thus switches driving transmission and driving transmission cancel between the output-side disc 52, the ring gear 72, and the gear 9.

The clutch CL disengageably connects the intermediate shaft 4 and the rotation member 41. In other words, when the clutch CL is in an engaging state (driving transmission state), the driving force is transmitted between the output-side disc 52 and the sun gear 71 through the intermediate shaft 4 and the gear 8. When the clutch CL is in a disengaging state (driving transmission cancel state), the driving force is not transmitted between the output-side disc 52 and the sun gear 71 through the intermediate shaft 4 and the gear 8. The clutch CL thus switches driving transmission and driving transmission cancel between the output-side disc 52 and the sun gear 71.

The arrangement of the control system of the continuously variable transmission 1 will be described next. The continuously variable transmission 1 includes a control unit 100. The control unit 100 can be configured to control not only the continuously variable transmission 1 but also the driving source 10 and the like. If a control unit configured to control the driving source 10 is provided independently of the control unit 100, they can communicate information to each other.

The control unit 100 includes a CPU, storage devices such as a RAM and a ROM, an I/O interface, a communication interface, and the like. The control unit executes a program stored in the storage device and controls an actuator 110 based on the detection result of a sensor SR and the like.

The sensor SR includes rotation speed detection sensors SR1 to SR3, an AP sensor SR4, and a slope sensor SR5. Each of the rotation speed detection sensors SR1 to SR3 detects the rotation speed of a rotation member. In this embodiment, each of the rotation speed detection sensors SR1 to SR3 is assumed to be a pulse sensor such as a magnetic pickup sensor. The rotation speed detection sensor SR1 detects the rotation speed of the input-side discs 51 (that is, the rotation speed of the input shaft 2). The rotation speed detection sensor SR2 detects the rotation speed of the output-side disc 52. The rotation speed detection sensor SR3 detects the rotation speed of the gear 31 (that is, the rotation speed of the output shaft 3). The AP sensor SR4 is provided on the accelerator pedal and detects the accelerator opening. The slope sensor SR5 is, for example, an acceleration sensor and detects the grade of the running road of the vehicle.

The actuator 110 includes, for example, a control valve that makes the power roller 53 swing by an oil pressure, a control valve that drives the clutches CH and CL by an oil pressure, and the like.

The operation mode of the continuously variable transmission 1 will be described next with reference to FIGS. 2A to 2C. In this embodiment, the engaging relationship of the clutches CH and CL is switched, thereby selecting two operation modes called a high mode and a low mode. With a relatively simple arrangement, operation mode transition can be implemented by reconnecting the clutches CH and CL.

Figure 2A:
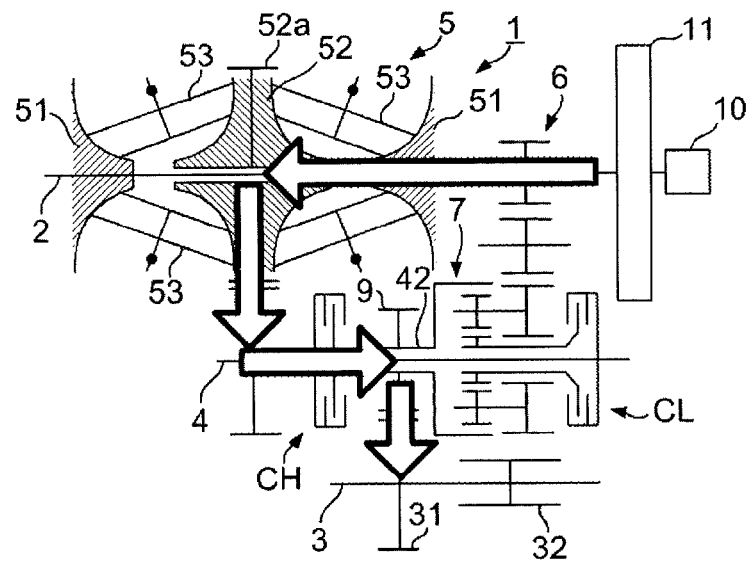
FIG. 2A is a view showing the power transmission path in a high mode.
Figure 2B:
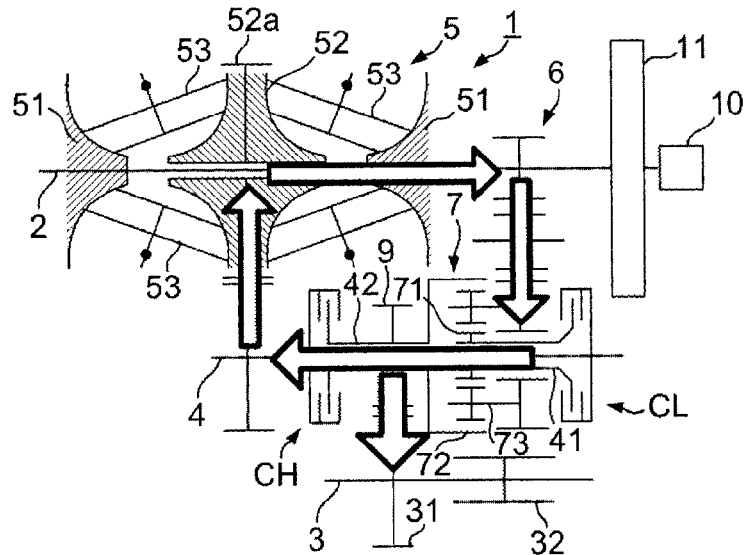
FIG. 2B is a view showing the power transmission path in a low mode (in the forward range)
Figure 2C:
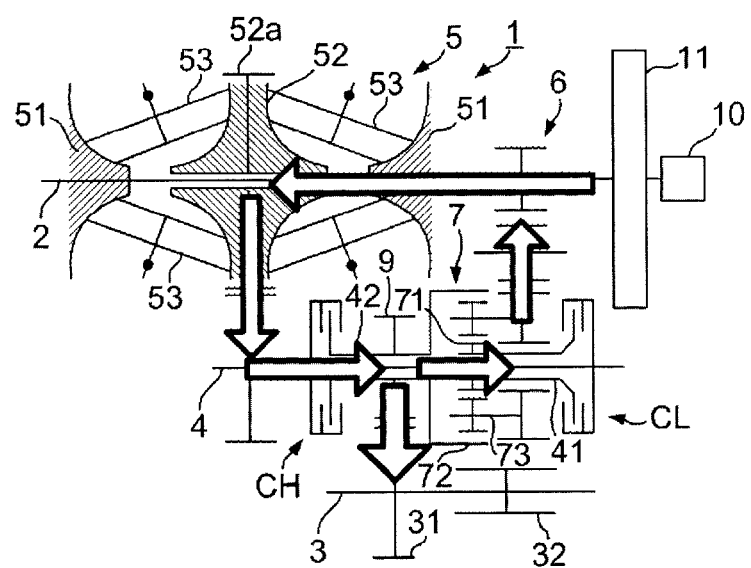
FIG. 2C is a view showing the power transmission path in a low mode (in the reverse range)

FIG. 2A shows the driving force transmission path when the high mode is selected. FIG. 2B shows the driving force transmission path when the low mode is selected, and the forward range is set. FIG. 2C shows the driving force transmission path when the low mode is selected, and the reverse range is set.

The high mode is established by setting the clutch CH in the engaging state and the clutch CL in the disengaging state. The driving force of the driving source 10 is transmitted to the output shaft 3 through the continuously variable transmission mechanism 5, the rotation member 42, and the gear 9. The planetary gear mechanism 7 does not contribute to driving force transmission because the sun gear 71 can freely rotate. Hence, the high mode can be regarded as an operation mode to transmit the driving force through only the continuously variable transmission mechanism 5 out of the continuously variable transmission mechanism 5 and the planetary gear mechanism 7.

The low mode is established by setting the clutch CL in the engaging state and the clutch CH in the disengaging state. When the clutch CL is set in the engaging state, the intermediate shaft 4 and the rotation member 41 are connected. For this reason, the driving force of the driving source 10 is input to the sun gear 71 through the continuously variable transmission mechanism 5. On the other hand, the driving force of the driving source 10 is always input to the carrier 73 through the input shaft 2 and the idle gear train 6 without an intervention of the continuously variable transmission mechanism 5, as described above. For this reason, the planetary gear mechanism 7 differentially operates, and the driving force is output through the ring gear 72. Since the ring gear 72 is fixed to the rotation member 42, the driving force of the driving source 10 is transmitted to the output shaft 3 through the rotation member 42 and the gear 9. In the low mode, both the continuously variable transmission mechanism 5 and the planetary gear mechanism 7 thus contribute to driving force transmission. Hence, the low mode can be regarded as an operation mode to transmit the driving force through both the continuously variable transmission mechanism 5 and the planetary gear mechanism 7.

Figure 3A:
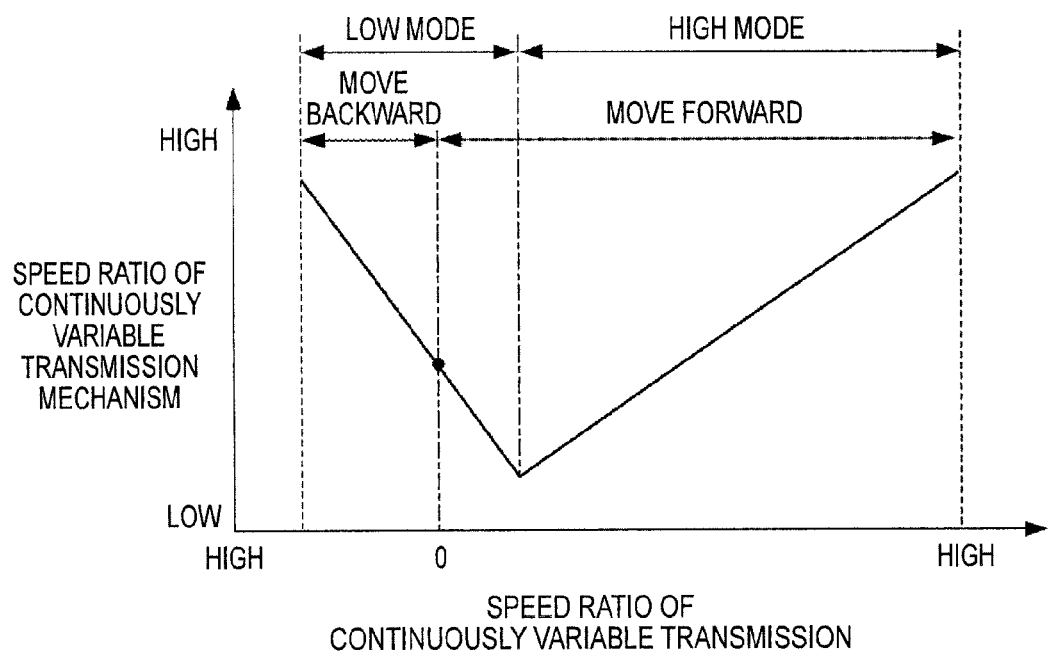
FIG. 3A is a graph showing the relationship between the speed ratio of the continuously variable transmission and the speed ratio of a continuously variable transmission mechanism.

FIG. 3A is a graph showing the relationship between the speed ratio (ratio) of the continuously variable transmission 1 and the speed ratio (ratio) of the continuously variable transmission mechanism 5 according to this embodiment. The speed ratio of the continuously variable transmission 1 means the speed ratio between the input shaft 2 and the output shaft 3. The speed ratio of the continuously variable transmission mechanism 5 means the speed ratio between the input-side discs 51 and the output-side disc 52.

The low mode is the operation mode for low-speed forward movement and reverse movement. The high mode is the operation mode for high-speed running. In the low mode, a relationship is obtained in which as the speed ratio of the continuously variable transmission mechanism 5 increases, the speed ratio of the continuously variable transmission 1 decreases. In the high mode, a relationship is obtained in which as the speed ratio of the continuously variable transmission mechanism 5 increases, the speed ratio of the continuously variable transmission 1 also increases.

The low mode includes geared neutral (GN) that stops rotation of the output shaft 3 when the speed ratio of the continuously variable transmission mechanism 5 is a predetermined speed ratio. The geared neutral is set by the geared ratio between three elements of the planetary gear mechanism 7, that is, the sun gear 71, the ring gear 72, and the pinion 74 of the carrier 73. In the low mode, in a range where the speed ratio of the continuously variable transmission mechanism 5 is higher than the predetermined speed ratio at which the geared neutral is attained, the output shaft 3 rotates in the reverse direction, and the vehicle moves backward (FIG. 2C). In a range where the speed ratio of the continuously variable transmission mechanism 5 is lower than the predetermined speed ratio at which the geared neutral is attained, the output shaft 3 rotates in the normal direction, and the vehicle moves forward (moves forward by low-speed running) (FIG. 2B). That is, in the low mode, it is possible to perform conversion between normal rotation and reverse rotation of the output shaft 3 around the geared neutral by adjusting the speed ratio of the continuously variable transmission mechanism 5.

Setting of the speed ratio of the continuously variable transmission mechanism 5 will be described next. The target speed ratio of the continuously variable transmission mechanism 5 from the viewpoint of control can be set by target speed ratio=constant×vehicle speed/target rotation speed of driving source 10. The target rotation speed of the driving source 10 is calculated in accordance with, for example, the vehicle speed and the accelerator opening.

To detect the vehicle speed, the rotation speed of a rotation member whose rotation speed increases/decreases in proportion to the vehicle speed out of the rotation members provided in the vehicle is detected. In this embodiment, for example, the sensor SR3 is used. The sensor SR3 is a pulse sensor that detects the rotation speed of the output shaft 3 as already described above.

Figure 3B:
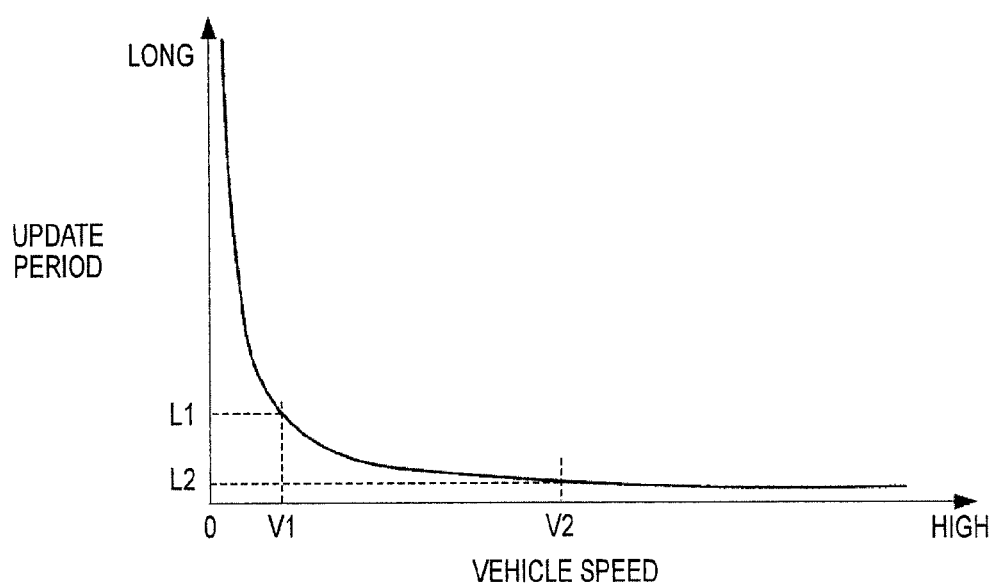
FIG. 3B is a graph showing the characteristic of a pulse sensor.

FIG. 3B is a graph showing the characteristic of the sensor SR3 that detects the rotation speed of the output shaft 3. In the graph of FIG. 3B, a vehicle speed V is plotted along the abscissa, and an update period L of the detected vehicle speed V is plotted along the ordinate. Using the sensor SR3, the data of the vehicle speed V cannot be updated within a period L1 (for example, L1=10 msec) in the range (0≤V<V1) lower than a vehicle speed V1 (for example, V1=5 km/h) shown in the graph of FIG. 3B. In addition, the data of the vehicle speed V cannot be updated within a period L2 (for example, L2=5 msec) in the range (V1≤V<V2) where the vehicle speed V is V1 (inclusive) to V2 (for example, V2=15 km/h) (exclusive).

Hence, if the output performance of the sensor SR3 is, for example, 2 Hz, a vehicle speed of 0.1 km/h or less cannot be detected. For this reason, the sensor SR3 may be unable to correctly detect the rotation speed of the output shaft 3 in the very low speed state near the geared neutral.

To prevent this, in this embodiment, the vehicle speed is estimated and specified in the very low speed state. As the estimation method, the acceleration of the vehicle is estimated, and the estimated acceleration is integrated, thereby calculating the vehicle speed. More specifically, the formula is given by $$\text{estimated vehicle speed} = \int \{(\text{target driving force of vehicle} - \text{running resistance of vehicle})/\text{vehicle weight}\} dt \quad (1)$$

where dt is the minute time.

Figure 4:
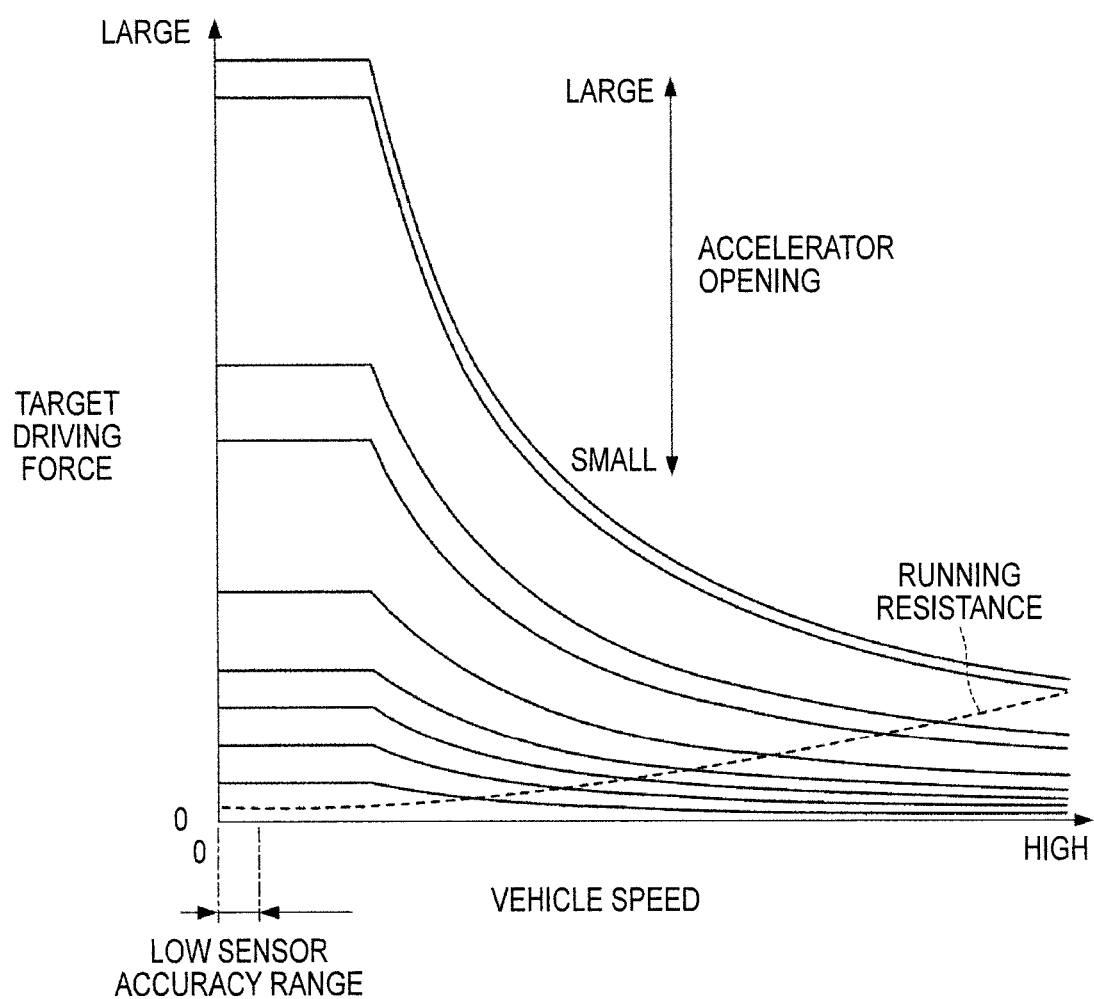
FIG. 4 is an explanatory view of a map that defines the relationship between a target driving force, a vehicle speed, and an accelerator opening.

The target driving force of the vehicle can be calculated based on the accelerator opening. As the accelerator opening, the detection result of the AP sensor SR4 is used. Target driving forces according to accelerator openings can be mapped in advance, stored in the storage device of the control unit 100, and read out for use. FIG. 4 shows an example. In the example of FIG. 4, the relationship between a vehicle speed and a target driving force is defined in correspondence with an accelerator opening (AP). Note that the relationship between a vehicle speed and a running resistance is indicated by the broken line for reference. Basically, the larger the accelerator opening relatively is, the larger the target driving force relatively is. The smaller the accelerator opening relatively is, the smaller the target driving force relatively is. Although the example of FIG. 4 shows nine types of accelerator openings, they can further be fractionalized in fact.

In the example of FIG. 4, the low sensor accuracy range schematically indicates the very low speed range where the sensor SR3 cannot correctly detect the rotation speed of the output shaft 3. In the very low speed range, the target driving force is constant independently of the vehicle speed. Hence, the target driving force can be set in accordance with the accelerator opening.

Examples of the running resistance of the vehicle represented by equation (1) are an air resistance, a rolling resistance, a road grade resistance, and an acceleration resistance. All of running resistances of these types may be taken into consideration when calculating the estimated speed. This can improve the estimation accuracy. However, some resistances have a little influence in the very low speed range. Hence, only some of the above resistances (for example, only the road grade resistance or only the road grade resistance and the rolling resistance) may be taken into consideration. For example, the influence of the road grade resistance is assumed not to be small in the very low speed range. Hence, if at least the road grade resistance is included as the running resistance, the speed setting accuracy can be improved.

The air resistance can be calculated from the frontal projected area of the vehicle, the vehicle speed, and the coefficient of air resistance. The frontal projected area and the coefficient of air resistance can be set in advance. As the vehicle speed, an estimated speed calculated by the preceding processing loop can be used. The initial value of the estimated speed may be set to 0. The rolling resistance can be calculated from the vehicle weight and the coefficient of rolling resistance. Both the vehicle weight and the coefficient of rolling resistance can be set in advance.

The road grade resistance can be calculated from the vehicle weight and the grade of the running road. The grade of the running road can be decided based on the detection result of the slope sensor SR5. The acceleration resistance can be calculated from the acceleration of the vehicle, the vehicle weight, and the weight and acceleration of each rotation member of the driving system.

The vehicle weight used in equation (1) and used to calculate the running resistance can be the gross weight of the vehicle. For more correct calculation, the weight of each passenger is preferably added. In this case, for example, a weight (for example, 55 kg) corresponding to one passenger may be added to the gross weight of the vehicle. The vehicle weight information can be stored in, for example, the storage device of the control unit 100.

Figure 5A:
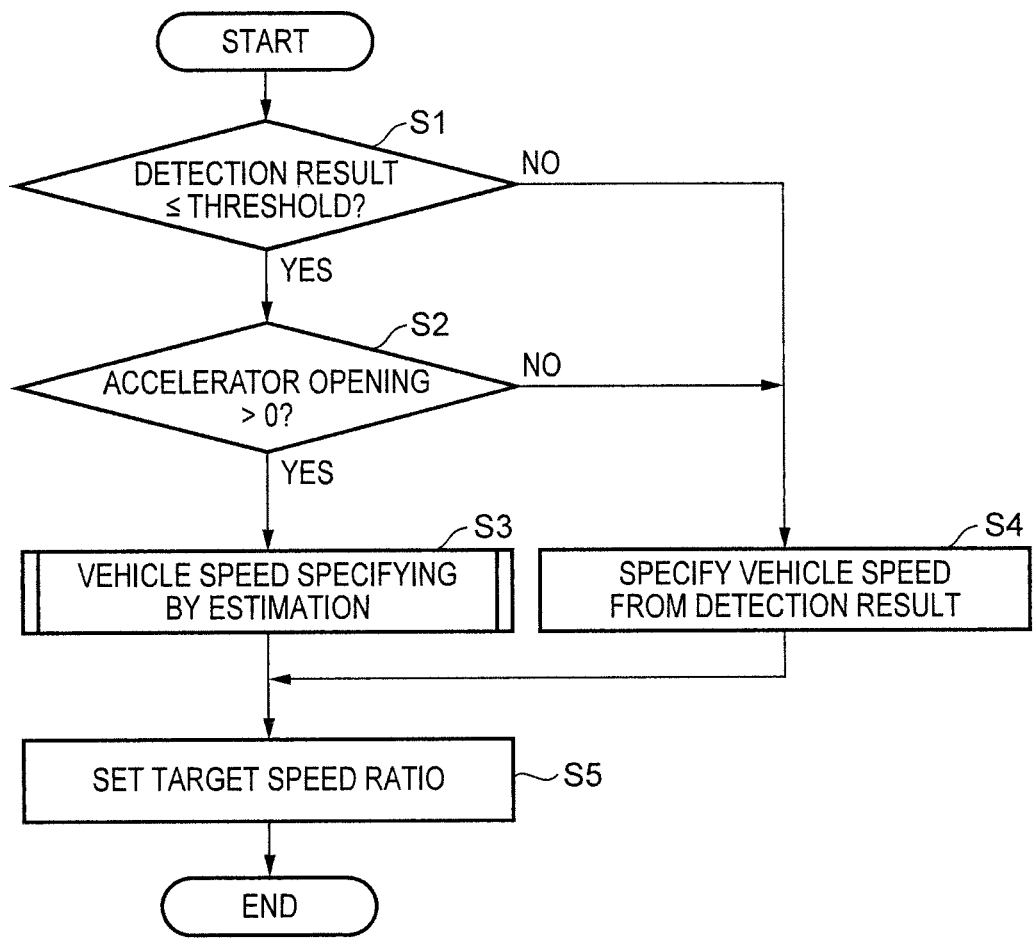
FIGS. 5A and 5B are flowcharts showing an example of processing executed by a control unit.

According to this embodiment, in the very low speed range, the vehicle speed can be estimated and decided, and the speed ratio of the continuously variable transmission mechanism 5 can be set in the above-described way. FIG. 5A is a flowchart showing an example of processing executed by the control unit 100 and, particularly, an example of processing of specifying the vehicle speed and setting the speed ratio of the continuously variable transmission mechanism 5. The speed ratio of the continuously variable transmission mechanism 5 is maintained at a more appropriate speed ratio by repetitively executing the processing shown in FIG. 5A.

In step S1, it is determined whether the rotation speed of the output shaft 3 represented by the detection result of the sensor SR3 is equal to or lower than a threshold. The threshold is set in accordance with the range where the sensor SR3 cannot correctly detect the rotation speed of the output shaft 3, and can be set to the upper limit of values in which the reliability of the detection result of the sensor SR3 is low. For example, if the rotation speed of the output shaft 3 is very low, the rotation speed represented by the detection result of the sensor SR3 is assumed to be 0, and the threshold can be set to 0. If the rotation speed of the output shaft 3 represented by the detection result of the sensor SR3 is equal to or lower than the threshold, the process advances to step S2. If the rotation speed exceeds the threshold, the process advances to step S4.

In step S2, the detection result of the AP sensor SR4 is acquired, and it is determined whether the accelerator opening exceeds 0%. If the accelerator opening is 0%, the vehicle can be regarded as substantially being at rest, and the vehicle speed can be decided from the detection result of the sensor SR3 without any problem. Hence, if the accelerator opening does not exceed 0%, the process advances to step S4. On the other hand, if the accelerator opening exceeds 0%, the vehicle is regarded as being in the very low speed state, and the process advances to step S3.

Figure 5B:
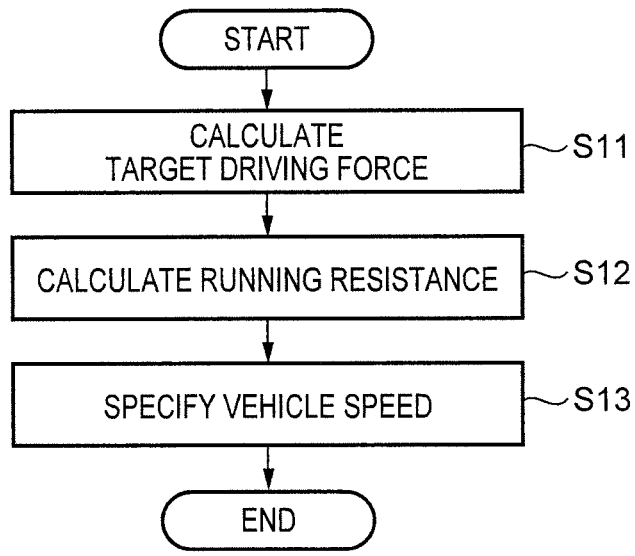

In step S3, processing of specifying the vehicle speed by estimation is performed. FIG. 5B is a flowchart showing an example of the processing. In step S11, the target driving force of the vehicle is calculated based on the map shown in FIG. 4 and the detection result of the AP sensor SR4 acquired in step S2. In step S12, the running resistance of the vehicle is calculated by the above-described method. In step S13, an estimated speed is calculated by substituting the calculation results of steps S11 and S12 into equation (1), and the calculation result is specified as the vehicle speed.

Referring back to FIG. 5A, in step S4, the vehicle speed is specified from the detection result of the sensor SR3. In step S5, the target speed ratio of the continuously variable transmission mechanism 5 is set based on the vehicle speed specified in step S3 or S4 and a separately set target rotation speed of the driving source 10. The processing of one unit thus ends. After that, the continuously variable transmission mechanism 5 is controlled to attain the set target speed ratio.

As described above, in this embodiment, if the detection result of the sensor SR3 is equal to or lower than the threshold, the vehicle speed is set based on the target driving force (S11), the running resistance (S12), and the vehicle weight without using the detection result (S3). Hence, not an accurate sensor that leads to an increase in cost but a pulse sensor such as a magnetic pickup sensor that is conventionally commonly used can be used as the sensor SR3. That is, it is possible to set the speed ratio of the continuously variable transmission mechanism 5 even in a very low speed range while suppressing an increase in cost.

<Another Embodiment>

In the above embodiment, whether the vehicle is at rest or just comes to a halt is estimated based on the accelerator opening in the process of step S2 shown in FIG. 5A. However, the estimation may be done based on the detection result of an operation for the foot brake. This makes it possible to cope with creep running.

Figure 6A:
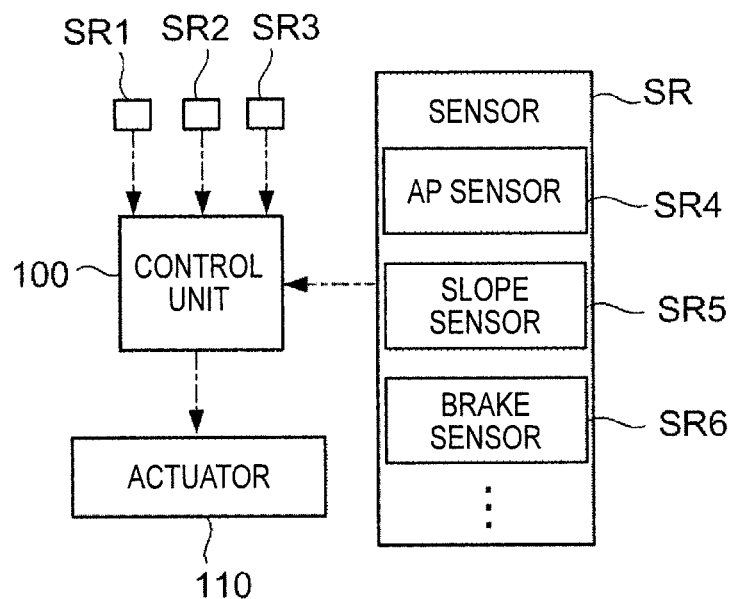
FIG. 6A is a block diagram showing another example of the arrangement of the control system.

FIG. 6A is a block diagram of a control system according to this embodiment. A sensor SR includes a brake sensor SR6. The brake sensor SR6 detects the presence/absence of a driver's operation on the foot brake and is turned on if the operation is performed (if the foot brake is pressed) and off if the operation is not performed.

Figure 6B:
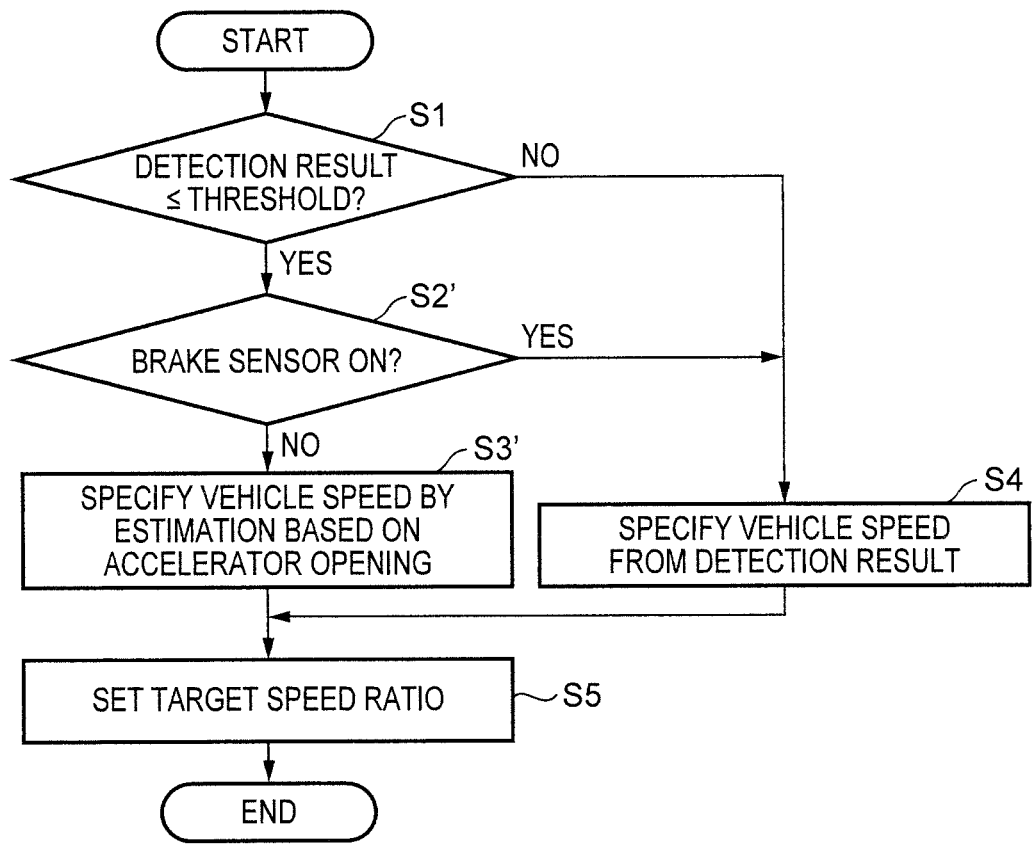
FIG. 6B is a flowchart showing another example of processing executed by the control unit.

FIG. 6B illustrates an example of processing of a control unit 100 according to this embodiment, which replaces the example of processing shown in FIG. 5A. Points different from the processing shown in FIG. 5A will be described below.

In this embodiment, the process of step S2' is performed in place of the process of step S2 in FIG. 5A. That is, in step S2', it is determined whether the brake sensor SR6 is on. If the brake sensor SR6 is on, the vehicle can be regarded as substantially being at rest, and the vehicle speed can be decided from the detection result of a sensor SR3 without any problem. Hence, if the brake sensor SR6 is on, the process advances to step S4. On the other hand, if the brake sensor SR6 is off, the vehicle is regarded as being in the very low speed state, and the process advances to step S3'. In step S3', the vehicle speed is specified by estimation based on the accelerator opening. This process can be the same as, for example, the process of step S3 in FIG. 5A (processing shown in FIG. 5B). The processes of steps S1, S4, and S5 are the same as in the example of processing shown in FIG. 5A. In this way, it may be determined based on the detection result of the brake sensor SR6 whether the vehicle is substantially at rest or in the very low speed state.

<Summary of Embodiments>

According to the embodiment, there is provided a continuously variable transmission for a vehicle, comprising: a continuously variable transmission mechanism to which a driving force from a driving source provided in the vehicle is input; and a planetary gear mechanism including a plurality of rotation elements which are a sun gear, a ring gear, or a carrier, wherein the continuously variable transmission is capable of operating in a predetermined operation mode, in the predetermined operation mode, the driving force is input to a first rotation element out of said plurality of rotation elements through said continuously variable transmission mechanism, the driving force is input to a second rotation element out of said plurality of rotation elements without an intervention of said continuously variable transmission mechanism, and the driving force is output through a third rotation element out of said plurality of rotation elements, said continuously variable transmission mechanism further comprises: a target driving force calculation unit configured to calculate a target driving force of the vehicle based on an accelerator opening; a running resistance calculation unit configured to calculate a running resistance of the vehicle; a rotation speed detection unit configured to detect a rotation speed of a rotation member provided in the vehicle; a vehicle speed specifying unit configured to specify a vehicle speed based on a detection result of said rotation speed detection unit; and a setting unit configured to set a target speed ratio of said continuously variable transmission mechanism based on the vehicle speed specified by said vehicle speed specifying unit and a target rotation speed of the driving source, and said vehicle speed specifying unit specifies the vehicle speed from the detection result when the detection result of said rotation speed detection unit exceeds a threshold, and specifies the vehicle speed based on the target driving force calculated by said target driving force calculation unit, the running resistance calculated by said running resistance calculation unit, and a weight of the vehicle when the detection result of said rotation speed detection unit is not more than the threshold.

According to this arrangement, when the detection result of the rotation speed detection unit is not more than the threshold, the vehicle speed is set based on the target driving force calculated by the target driving force calculation unit, the running resistance calculated by the running resistance calculation unit, and the weight of the vehicle without using the detection result of the rotation speed detection unit. It is therefore possible to set the speed ratio of the continuously variable transmission mechanism even in a very low speed range while suppressing an increase in cost.

According to the embodiment, there is provided the continuously variable transmission for the vehicle, wherein the continuously variable transmission mechanism comprises a toroidal type continuously variable transmission mechanism comprising an input-side disc connected to an input shaft, an output-side disc configured to be rotatable and be coaxial with respect to the input shaft, and a rolling element configured to frictionally roll between the input-side disc and the output-side disc, and in the predetermined operation mode, rotation of an output shaft of the continuously variable transmission for the vehicle can be converted between normal rotation and reverse rotation around a stop state in accordance with a speed ratio of the continuously variable transmission mechanism.

According to this arrangement, the speed ratio in the very low speed range can be set by the toroidal type continuously variable transmission mechanism.

According to the embodiment, there is provided the continuously variable transmission for the vehicle, further comprising a first clutch configured to switch driving transmission and driving transmission cancel between the output-side disc and the first rotation element, and a second clutch configured to switch driving transmission and driving transmission cancel between the output-side disc and the third rotation element, wherein the driving force is always input to the second rotation element through the input shaft without the intervention of the continuously variable transmission mechanism, and in the predetermined operation mode, the first clutch is set in a driving transmission state, and the second clutch is set in a driving transmission cancel state.

According to this arrangement, the operation mode can be changed to the predetermined operation mode by controlling the first clutch and the second clutch.

According to the embodiment, there is provided the continuously variable transmission for the vehicle, wherein the rotation speed detection unit comprises a pulse sensor configured to detect the rotation speed of an output shaft of the continuously variable transmission for the vehicle, and a rotation speed serving as the threshold is 0.

According to this arrangement, it is possible to set the speed ratio of the continuously variable transmission mechanism even in the very low speed range while using a pulse sensor such as a magnetic pickup sensor that is conventionally commonly used.

According to the embodiment, there is provided the continuously variable transmission for the vehicle, further comprising a slope detection unit configured to detect a grade of a running road of the vehicle, wherein the running resistance calculation unit calculates, as the running resistance, at least a road grade resistance based on a detection result of the grade detection unit.

According to this arrangement, it is possible to improve the speed setting accuracy by including the grade resistance as the running resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application Nos. 2014-140835, filed Jul. 8, 2014 and 2015-082848, filed Apr. 14, 2015, which are hereby incorporated by reference herein in their entirety.

What is claimed is:

1. A continuously variable transmission for a vehicle, comprising:
   a continuously variable transmission mechanism to which a driving force from a driving source provided in the vehicle is input; and
   a planetary gear mechanism including a plurality of rotation elements, the plurality of rotation elements being a sun gear, a ring gear, or a carrier,
   wherein the continuously variable transmission is capable of operating in a predetermined operation mode,
   in the predetermined operation mode,
   the driving force is input to a first rotation element out of said plurality of rotation elements through said continuously variable transmission mechanism,
   the driving force is input to a second rotation element out of said plurality of rotation elements without an intervention of said continuously variable transmission mechanism, and
   the driving force is output through a third rotation element out of said plurality of rotation elements,
   said continuously variable transmission mechanism further comprises:
   a target driving force calculation unit configured to calculate a target driving force of the vehicle based on an accelerator opening;
   a running resistance calculation unit configured to calculate a running resistance of the vehicle;
   a rotation speed detection unit configured to detect a rotation speed of a rotation member provided in the vehicle;
   a vehicle speed specifying unit configured to specify a vehicle speed based on a detection result of said rotation speed detection unit; and
   a setting unit configured to set a target speed ratio of said continuously variable transmission mechanism based on the vehicle speed specified by said vehicle speed specifying unit and a target rotation speed of the driving source, and
   said vehicle speed specifying unit
   specifies the vehicle speed from the detection result when the detection result of said rotation speed detection unit exceeds a threshold, and
   specifies the vehicle speed based on the target driving force calculated by said target driving force calculation unit, the running resistance calculated by said running resistance calculation unit, and a weight of the vehicle when the detection result of said rotation speed detection unit is not more than the threshold.

2. The continuously variable transmission according to claim 1, wherein said rotation speed detection unit comprises a pulse sensor configured to detect the rotation speed of an output shaft of the continuously variable transmission for the vehicle, and
   a rotation speed serving as the threshold is 0.

3. The continuously variable transmission according to claim 1, further comprising a slope detection unit configured to detect a grade of a running road of the vehicle,
   wherein said running resistance calculation unit calculates, as the running resistance, at least a road grade resistance based on a detection result of said grade detection unit.

4. The continuously variable transmission according to claim 1, wherein said continuously variable transmission mechanism comprises a toroidal type continuously variable transmission mechanism comprising:
   an input-side disc connected to an input shaft;
   an output-side disc configured to be rotatable and be coaxial with respect to the input shaft; and
   a rolling element configured to frictionally roll between said input-side disc and said output-side disc, and
   in the predetermined operation mode,
   rotation of an output shaft of the continuously variable transmission for the vehicle can be converted between normal rotation and reverse rotation around a stop state in accordance with a speed ratio of said continuously variable transmission mechanism.

5. The continuously variable transmission according to claim 4, further comprising:
   a first clutch configured to switch between a driving transmission state and a driving transmission cancel state between said output-side disc and said first rotation element; and
   a second clutch configured to switch between the driving transmission state and the driving transmission cancel state between said output-side disc and said third rotation element,
   wherein the driving force is always input to said second rotation element through the input shaft without the intervention of said continuously variable transmission mechanism, and
   in the predetermined operation mode, said first clutch is set in the driving transmission state, and said second clutch is set in the driving transmission cancel state.

* * * * *